(12) United States Patent
Lee et al.

(10) Patent No.: US 8,295,847 B2
(45) Date of Patent: Oct. 23, 2012

(54) METHOD FOR DETECTING STATIONARY USERS AND CALL ADMISSION CONTROL IN WIRELESS COMMUNICATION SYSTEM

(75) Inventors: Seung-Que Lee, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 163 days.

(21) Appl. No.: 12/738,170

(22) PCT Filed: Aug. 21, 2008

(86) PCT No.: PCT/KR2008/004889
§ 371 (c)(1),
(2), (4) Date: Apr. 15, 2010

(87) PCT Pub. No.: WO2009/057886
PCT Pub. Date: May 7, 2009

(65) Prior Publication Data
US 2010/0227619 A1 Sep. 9, 2010

(30) Foreign Application Priority Data
Nov. 1, 2007 (KR) .................. 10-2007-0110857

(51) Int. Cl.
*H04W 36/00* (2009.01)
*H04W 72/04* (2009.01)
*H04L 12/68* (2006.01)
(52) U.S. Cl. ..................................................... 455/446
(58) Field of Classification Search ............... 455/456.1, 455/446, 447, 450, 509, 517; 370/331, 228, 370/230, 230.1, 322, 326, 329, 232; 375/229
See application file for complete search history.

(56) References Cited

U.S. PATENT DOCUMENTS

| | | | |
|---|---|---|---|
| 5,623,535 A | 4/1997 | Leung et al. | |
| 5,737,704 A * | 4/1998 | Jin et al. | 455/450 |
| 6,842,618 B2 * | 1/2005 | Zhang | 455/452.1 |
| 6,981,047 B2 | 12/2005 | Hanson et al. | |
| 7,023,798 B2 | 4/2006 | Bourlas et al. | |
| 7,113,791 B2 * | 9/2006 | Lepschy et al. | 455/452.2 |
| 7,433,692 B2 * | 10/2008 | De Santis et al. | 455/445 |
| 7,826,366 B2 * | 11/2010 | Wu et al. | 370/235 |
| 7,924,804 B2 * | 4/2011 | Wengerter et al. | 370/345 |
| 2003/0186705 A1 * | 10/2003 | Lahav et al. | 455/451 |
| 2004/0116124 A1 * | 6/2004 | Lepschy et al. | 455/450 |
| 2005/0068920 A1 * | 3/2005 | Zhang | 370/329 |
| 2005/0096089 A1 | 5/2005 | Ishii et al. | |
| 2008/0311920 A1 * | 12/2008 | Xu et al. | 455/450 |
| 2009/0316651 A1 * | 12/2009 | Lee et al. | 370/331 |

FOREIGN PATENT DOCUMENTS
EP 0915592 A1 5/1999
(Continued)

*Primary Examiner* — William D Cumming
(74) *Attorney, Agent, or Firm* — Nelson Mullins Riley & Scarborough LLP; EuiHoon Lee, Esq.

(57) ABSTRACT

The present invention relates to a stationary user detecting system and method and a call admission control method using the same in a wireless communication system. A plurality of base stations located in the wireless Internet system detect a stationary user at regular time intervals and maintain it by a predetermined number of cases for each terminal. Information on the maintained stationary user is recalculated with a stationary probability for each base station so as to be used for call admission control. Therefore, the terminal of the stationary user detected in the wireless Internet system is calculated with the stationary probability value, which is applied to the call admission control, thereby minimizing reservation of undesired resources.

4 Claims, 2 Drawing Sheets

| | FOREIGN PATENT DOCUMENTS | | |
|---|---|---|---|
| JP | 2005-142766 | 6/2005 | |
| KR | 1020020058612 | 7/2002 | |
| KR | 1020040105478 | 12/2004 | |
| KR | 100749821 | 8/2007 | |
| WO | 2005/048636 A1 | 5/2005 | |
| WO | WO 2008/035884 | * | 3/2008 |

* cited by examiner

[Fig. 1]
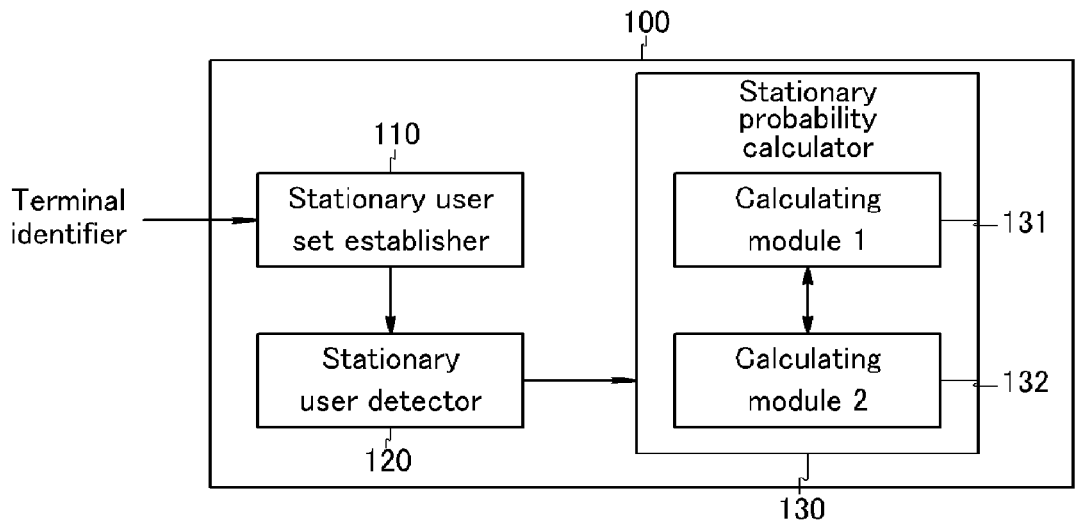
[Fig. 2]
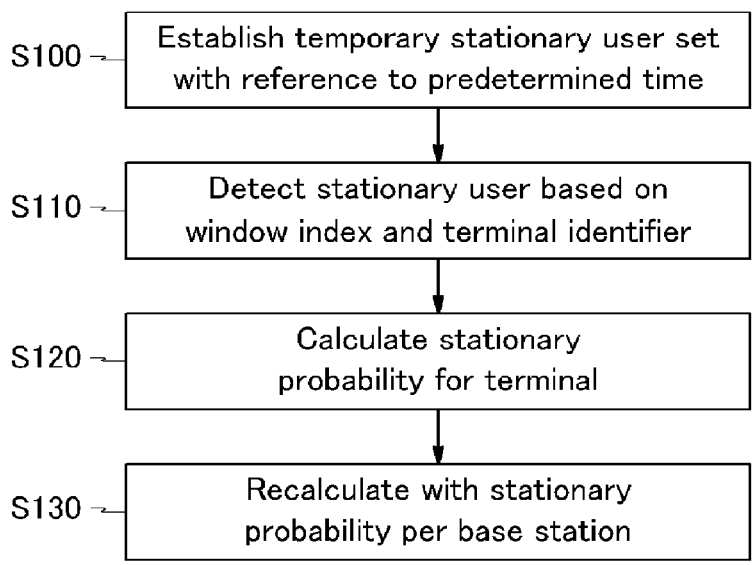

[Fig. 3]
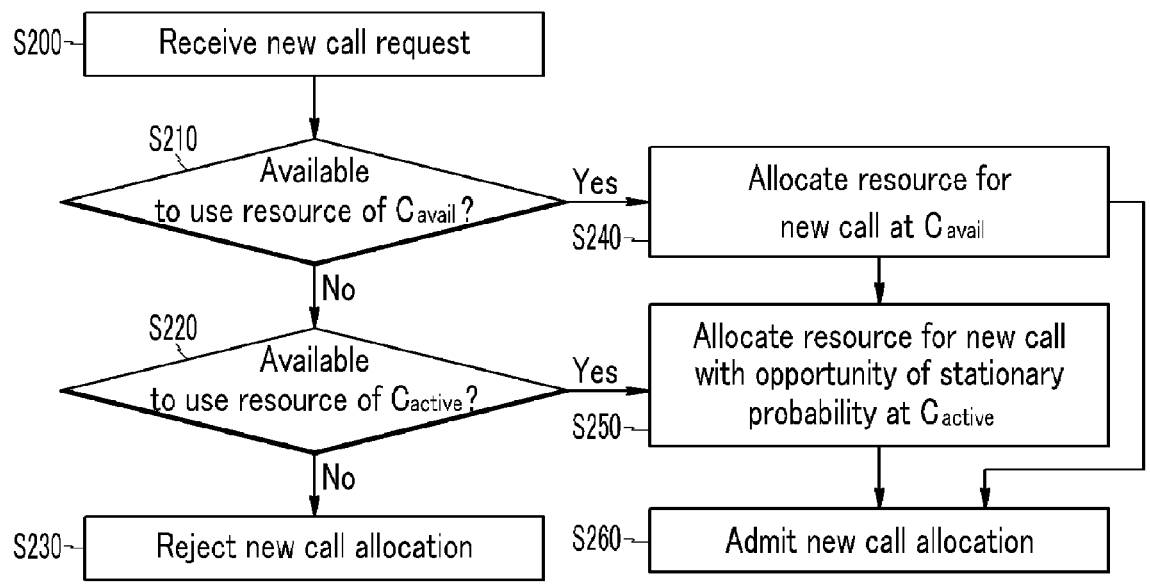

METHOD FOR DETECTING STATIONARY USERS AND CALL ADMISSION CONTROL IN WIRELESS COMMUNICATION SYSTEM

RELATED APPLICATIONS

This application is a 35 U.S.C. §371 national stage filing of PCT Application No. PCT/KR2008/004889 filed on Aug. 21, 2008, which claims priority to, and the benefit of, Korean Patent Application No. 10-2007-0110857 filed on Nov. 1, 2007. The contents of the aforementioned applications are hereby incorporated by reference.

TECHNICAL FIELD

The present invention relates to a system and method for detecting a stationary user in a wireless Internet system, and a method for controlling call admission by using a detected stationary user.

This work was supported by the IT R&D program of MIC/IITA [2006-S-012-02, Development of Middleware Platform Technology based on the SDR Mobile Station].

BACKGROUND ART

A call admission control is a method for increasing quality of service (QoS), and it represents a process for a base station to determine whether to receive a call requested by a terminal by considering an available resource of the base station in the case of a new call/connection (referred to as a call hereinafter) or a handover. When the system resource is insufficient, the base station does not allow a new call/connection or a handover call, thereby maintaining the QoS of a service call provided to a terminal.

When the base station performs the call admission control, the new call and the handover call have different importance. The user's loss is not significant regarding rejection on the new call since the user can perform the call again later. However, rejection on the handover call generates a relatively great loss to the user since the service provided to the terminal is interrupted. Therefore, a policy of maintaining the dropping probability of a handover call to be less than the blocking probability of a new call is used by providing a predetermined priority to the handover call and then reserving the resource.

A user of the wireless Internet system is generally an Internet service user. Therefore, a user walking on the road as opposed to a user riding in a car frequently uses a service while staying at a specific location because of the characteristic of the data service. The above-noted user is called a stationary user.

When the stationary user continuously stays in the boundary area of a cell, resources reserved by base stations other than a valid base station from among the base stations in the active cell in which the stationary user belongs are provided as unused for a long time until the terminal is moved again, which deteriorates the system performance since the rejection rate of a new call or a handover call is increased when the system resource is insufficient.

Therefore, a method for detecting a stationary user and a method for controlling the balance of a load of the detected stationary user by instructing a handover to the base station having sufficient resources have been researched.

For example, a method for applying a common set of a current active cell and an active cell that is given after a predetermined time has passed to neighboring base stations of the active cell and detecting the same has been provided. That method provides two snapshots in the system and detects a common factor of the two snapshots. This method efficiently detects the stationary user when the progress type of the terminal is linear, but reduces the stationary user's accuracy when the terminal moves randomly.

In addition, another method is to detect a stationary user, cancel the resource reserve for the stationary user from the reserve for the handover call, separately manage the resource reserve, and control the canceled call to be shared by a new call or a handover call. Since the stationary user's reserve is provided as a reserve for the handover call, the rejection rate of the handover call is problematically increased when an error occurs while detecting the stationary user.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a system and method for more accurately detecting the stationary user and efficiently using the resource reserve of the stationary user.

Technical Solution

An exemplary embodiment of the present invention provides a method for detecting a stationary user in a wireless communication system, including: establishing a stationary user set included in a first base station with reference to a predefined time; detecting whether a first terminal is a stationary user terminal based on information on the established stationary user set and a predefined window index; and calculating a first stationary probability for the first terminal detected as the stationary user terminal.

Another embodiment of the present invention provides a call admission control method including: receiving a new call request from a terminal; determining whether to allocate a first resource to the requested terminal, the first resource being an available resource to be allocated to the terminal by a base station; determining whether to allocate a second resource to the terminal by using a stationary probability for each base station when failing to allocate the first resource to the terminal, the second resource being a resource reserved for a handover call by the base station; and allocating the second resource to the terminal and admitting a new call allocation requested by the terminal when the second resource can be allocated to the terminal.

Yet another embodiment of the present invention provides a stationary user detecting system in a wireless communication system, including: a stationary user set establisher for receiving identifier information on a plurality of terminals included in a first base station region and at least one second base station region neighboring the first base station, and establishing a stationary user set by using identification information on at least one terminal included in common in the first base station region and the second base station region; a stationary user detector for detecting whether a specific terminal is a stationary user in the base station connected to the specific terminal based on stationary user set information established by the stationary user set establisher and a predefined window index; and a stationary probability calculator for calculating a degree of the specific terminal that is detected as a stationary user by the stationary user detector with a stationary probability, the degree being included in the stationary user during a period established by the window index.

Advantageous Effects

According to the present invention, undesired resource reservation is minimized by calculating a terminal of a stationary user detected in a wireless Internet system with a stationary probability value, and using it for the call admission control.

Further, efficiency of call admission control can be increased by using the calculated stationary probability value.

BRIEF DESCRIPTION OF THE DRAWINGS

FIG. 1 shows a configuration diagram of a stationary user detecting system according to an exemplary embodiment of the present invention.

FIG. 2 shows a flowchart of a stationary user detecting method according to an exemplary embodiment of the present invention.

FIG. 3 shows a flowchart of a new call admission control according to an exemplary embodiment of the present invention.

MODE FOR THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

In the specification, a mobile station (MS) may indicate a terminal, a mobile terminal (MT), a subscriber station (SS), a portable subscriber station (PSS), user equipment (UE), and an access terminal (AT), and may include entire or partial functions of the mobile terminal, the subscriber station, the portable subscriber station, and the user equipment.

In the specification, a base station (BS) may indicate an access point (AP), a radio access station (RAS), a node B (Node B), a base transceiver station (BTS) and a mobile multihop relay (MMR)-BS, and may include entire or partial functions of the base station, the access point, the radio access station, the node B, the base transceiver station, and the MMR-BS.

FIG. 1 shows a configuration diagram of a stationary user detecting system according to an exemplary embodiment of the present invention.

As shown in FIG. 1, the stationary user detecting system 100 includes a stationary user set establisher 110, a stationary user detector 120, and a stationary probability calculator 130.

The stationary user set establisher 110 receives identifier information of terminals in the regions of a plurality of base stations from the base stations located near the stationary user set establisher 110, compares it with identifier information of a terminal in the region of the stationary user set establisher 110, and establishes a set of terminals that are included in common. Set information of the selected terminals includes identifier information of the terminal, and it is used as information for detecting the stationary user in the base station region.

The stationary user detector 120 detects a stationary user based on stationary user set information established by the stationary user set establisher 110 and a predetermined window index. Here, in order to detect the stationary user, the stationary user detector 120 detects the stationary user by determining whether a specific terminal was included in a temporary stationary user set in the past by a window index number of times.

The stationary probability calculator 130 calculates the stationary user detected by the stationary user detector 120 with a stationary probability, and it includes a first calculating module 131 for calculating a stationary probability for the terminal, and a second calculating module 132 for calculating a stationary probability for each base station. A method for the first calculating module 131 and the second calculating module 132 to calculate the stationary probability will be described with reference to FIG. 2.

A method for detecting a stationary user in the stationary user detecting system will now be described with reference to FIG. 2.

FIG. 2 shows a flowchart of a stationary user detecting method according to an exemplary embodiment of the present invention.

As shown in FIG. 2, the stationary user set establisher 110 of the stationary user detecting system establishes a temporary stationary user set $$M_i^{stationary}(t)$$

with the time t as a variable as expressed in Equation 1 (S100). Here, the stationary user set is specified as temporary because the corresponding set is valid for the corresponding time variable and the stationary user set is updated at predetermined regular time intervals.

$$M_i^{stationary}(t) = \{m_a | m_a \in \{M_i^{active}(t) \cap M_j^{active}(t)\}, j \in N\text{-}BR_i\} \quad \text{(Equation 1)}$$

Equation 1 means a set of terminals included in common in the base station and $M_i^{active}$, of the neighboring base stations at the time t. Here, $m_a$ indicates an identifier of the terminal, and $NBR_i$ represents a plurality of base stations located near the base station i. $M_i^{active}$ means a terminal included active in an active cell of the base station i, and $M_j^{active}$ indicates a terminal included in an active cell of the base station j.

The stationary user detector 120 detects the stationary user located at the base station i through Equation 2 based on a predetermined window index and a terminal identifier (S110).

$$E(m_a, w) = 1, \text{ if } m_a \in M_i^{stationary}(t - w\delta) \quad \text{(Equation 2)}$$

$$0, \text{ otherwise}$$

Here, w that is a predetermined window index has values from 0 to W−1. Also, W is the maximum value of the window index.

As expressed in Equation 2, the base station inputs the terminal identifier and the window index as variables to check whether the terminal $m_a$ was included in the temporary stationary user set in the past. Here, the past indicates the range from the current time of detecting the stationary user to the time before the w number of times where w is the window index.

When the terminal $m_a$ was included in the temporary stationary user set in the existing w number of times, "1" is output, and in the other case, "0" is output. When "1" is output according to the detection result for the terminal $m_a$, the corresponding terminal represents the terminal that was consecutively receiving a service from the base station region.

When "0" is output, the corresponding terminal represents the terminal that is newly accessed to the base station in a like case of a handover or a new access. In order for the terminal to consecutively determine the stationary user state, the base station must calculate a temporary stationary user set at regular time intervals ($\delta$) and maintain the corresponding set by the number W of cases in the past. Here, the number W of cases means one of the numbers from 0 to W−1 of the window index w, and hence, the stationary user set is calculated by the number of cases generated by the window index.

The first calculating module 131 of the stationary probability calculator 130 calculates a stationary probability for the terminal based on information on the detected stationary user (S120). The method for calculating the stationary probability is expressed in Equation 3.

$$P_i^s(m_a) = \frac{\sum_{w=0}^{W-1} E(m_a, w)}{W} \quad \text{(Equation 3)}$$

Equation 3 is an expression of the degree to which the terminal was included in a temporary stationary user set list during the past W period with a probability value. In the exemplary embodiment of the present invention, the stationary user detecting errors generated by the irregular terminal movement are minimized by expressing the stationary users with the probabilistic values.

The second calculating module 132 of the stationary probability calculator 130 recalculates the stationary probability value for the terminal calculated by using Equation 3 as a stationary probability for each base station (S130). Recalculation with the stationary probability for each base station uses Equation 4.

if $P_i^s(m_a)$ is updated, $$P_i^s = \frac{\sum_{m_a \in M_i^{active}} P_i^s(m_a) \cdot RS(m_a)}{\sum_{m_a \in M_i^{active}} RS(m_a)} \quad \text{(Equation 4)}$$

Equation 4 sets the sizes of the resources required by the terminals in $M_i^{active}$ as weights, sums the sizes of the resources, and recalculates the probability for each base station. Here, $P_i^S$ indicates the stationary states of the terminals in $M_i^{active}$ of the base station i. That is, $P_i^S$ must be recalculated in linkage with the first calculating module 131 each time $P_i^S(m_a)$ is changed. Also, $RS(m_a)$ represents the amount of resources required by the terminal (ma).

A method for controlling a new call admission by using the stationary probability calculated through the above-described process will now be described with reference to FIG. 3.

FIG. 3 shows a flowchart of a new call admission control according to an exemplary embodiment of the present invention.

As shown in FIG. 3, when receiving a new call request from the terminal (S200), the base station determines whether to provide an available resource (hereinafter, $C_{avail}$) to the terminal (S210). The base station divides the entire resource (hereinafter, $C_{total}$) into a currently available resource ($C_{avail}$) and a currently allocated resource (hereinafter, $C_{allocated}$) according to the resource feature, and manages them.

Therefore, the entire resource is the sum of the allocated resources and the residual resources so that it is satisfied that "$C_{total} = C_{avail} + C_{allocated}$". Further, since the call that can be generated by the base station can be divided into a new call that is generated in the region and a handover call for the terminal having moved from another base station, the current available resource is the sum of the resources reserved to the new call (hereinafter, $C_{new}$) and the resources reserved to the handover call (hereinafter, $C_{active}$), and thereby $C_{avail} = C_{new} + C_{active}$.

When the resource of $C_{avail}$ can be allocated to the terminal according to the determination result of the previous step S210, the terminal allocates the resource for a new call of the terminal at $C_{avail}$ (S240), and transmits a new call allocation admitting message to the terminal (S260). However, when the resource of $C_{avail}$ is less than the resource requested by the terminal according to the determination result, the base station determines whether to allocate the resource of $C_{active}$, to the terminal (S220).

When the resource of $C_{active}$ is determined to be allocated to the terminal, the base station allocates the resource for a new call of the terminal with a stationary probability opportunity at $C_{active}$ (S250), admits a new call allocation to the terminal (S260), and transmits a message for notifying of the new call allocation admission to the terminal (S260). However, when it is determined that the terminal cannot acquire an opportunity of using the resource of $C_{active}$ with the stationary probability, the base station rejects new call allocation to the terminal (S230), and transmits a rejection message to the terminal.

Therefore, in the exemplary embodiment of the present invention, the resource reserve part for the stationary user is not distinguished, the stationary degree is managed according to the probabilistic value, and a handover call reserve is used instead when a new call resource is insufficient. Accordingly, influence on handover resource reserve caused by an error of stationary user detection is minimized.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A call admission control method comprising:
receiving a new call request from a terminal;
attempting to allocate a first resource to the requested terminal, the first resource being currently available resource of a base station;
allocating a second resource to the terminal by using a stationary probability for each base station in response to failing to allocate the first resource to the terminal due to the currently available resources not being enough to accept the terminal, the second resource being a resource reserved for a handover call by the base station; and
allocating the second resource to the terminal and admitting a new call allocation requested by the terminal when the second resource is available to be allocated to the terminal.

2. The method of claim 1, wherein the determining of whether to allocate the second resource includes allocating the first resource to the terminal and admitting the new call allocation requested by the terminal when the first resource can be allocated to the terminal.

3. The method of claim 1, wherein the method includes rejecting the new call allocation requested by the terminal when the second resource cannot be allocated to the terminal.

4. The method of claim 1, wherein the stationary probability for each base station is determined based on stationary probabilities for terminals positioned at each base station and an amount of resources required by the terminals.

* * * * *